(12) United States Patent
Marinkovich et al.

(10) Patent No.: US 6,212,781 B1
(45) Date of Patent: Apr. 10, 2001

(54) RECIPROCATING SAW

(75) Inventors: Dragomir C. Marinkovich, Butler; Roger Dean Neitzell, North Prairie, both of WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 09/169,509

(22) Filed: Oct. 9, 1998

(51) Int. Cl.[7] .................................................. B27B 19/04
(52) U.S. Cl. .................................................. 30/394; 74/57
(58) Field of Search ........................... 30/393, 392, 394; 173/176, 178; 74/55, 56, 57, 58; 464/182

(56) References Cited

U.S. PATENT DOCUMENTS

| | | | |
|---|---|---|---|
| Re. 35,258 | 6/1996 | Palm | 30/392 |
| 1,666,539 | * 4/1928 | Michell | 74/56 |
| 2,084,321 | * 6/1937 | Corradino et al. | 74/57 |
| 2,563,789 | * 8/1951 | Kurtz et al. | 74/55 X |
| 2,830,456 | * 4/1958 | Stafford | 74/57 X |
| 3,206,989 | * 9/1965 | Enders | 30/392 X |
| 3,585,719 | * 6/1971 | Kivela | 30/392 |
| 3,596,525 | * 8/1971 | Niesz | 74/57 |
| 3,802,079 | * 4/1974 | Ketchpel, Jr. et al. | 30/394 X |
| 3,945,120 | 3/1976 | Ritz | 30/393 |
| 4,031,763 | 6/1977 | Eisenberg | 74/50 |
| 4,125,033 | * 11/1978 | Riedl | 74/56 X |
| 5,007,172 | 4/1991 | Palm | 30/377 |
| 5,025,562 | 6/1991 | Palm | 30/392 |
| 5,050,307 | 9/1991 | Palm | 30/392 |
| 5,078,017 | 1/1992 | Zornes | 74/50 |
| 5,079,844 | 1/1992 | Palm | 30/392 |
| 5,134,777 | 8/1992 | Meyer et al. | 30/392 |
| 5,450,925 | * 9/1995 | Smith et al. | 30/394 X |
| 5,566,458 | 10/1996 | Bednar | 30/392 |
| 5,607,023 | 3/1997 | Palm | 173/178 |
| 5,607,265 | * 3/1997 | Lane | 30/392 X |
| 5,689,891 | * 11/1997 | Bednar et al. | 30/394 |
| 5,782,000 | 7/1998 | Bednar . | |
| 5,924,209 | * 7/1999 | Ward | 30/394 X |
| 5,964,810 | 9/1999 | Hoelderlin et al. . | |
| 6,012,346 | * 1/2000 | Vo | 30/392 X |
| 6,021,573 | * 2/2000 | Kikuchi et al. | 30/392 |

\* cited by examiner

Primary Examiner—Charles Goodman
(74) Attorney, Agent, or Firm—Michael Best & Friedrich LLP

(57) ABSTRACT

A reciprocating saw including a housing, a spindle mounted for reciprocation relative to the housing and having a front end adapted to support a saw blade, the spindle being movable through a cutting stroke and a return stroke, a motor for moving the spindle in a reciprocating fashion, and a reciprocating member interconnecting the motor with the spindle. The motor and the spindle define a drive force path from the motor to the spindle and passing through drive force bearing components of the reciprocating saw, and wherein at least part of the reciprocating member is in the drive force path. The reciprocating member is configured to counterbalance the spindle. A pivot body interconnects the spindle with the motor. A shock absorber is operatively positioned between the motor and the front end of the spindle, and is at least partially mounted within the spindle.

17 Claims, 4 Drawing Sheets

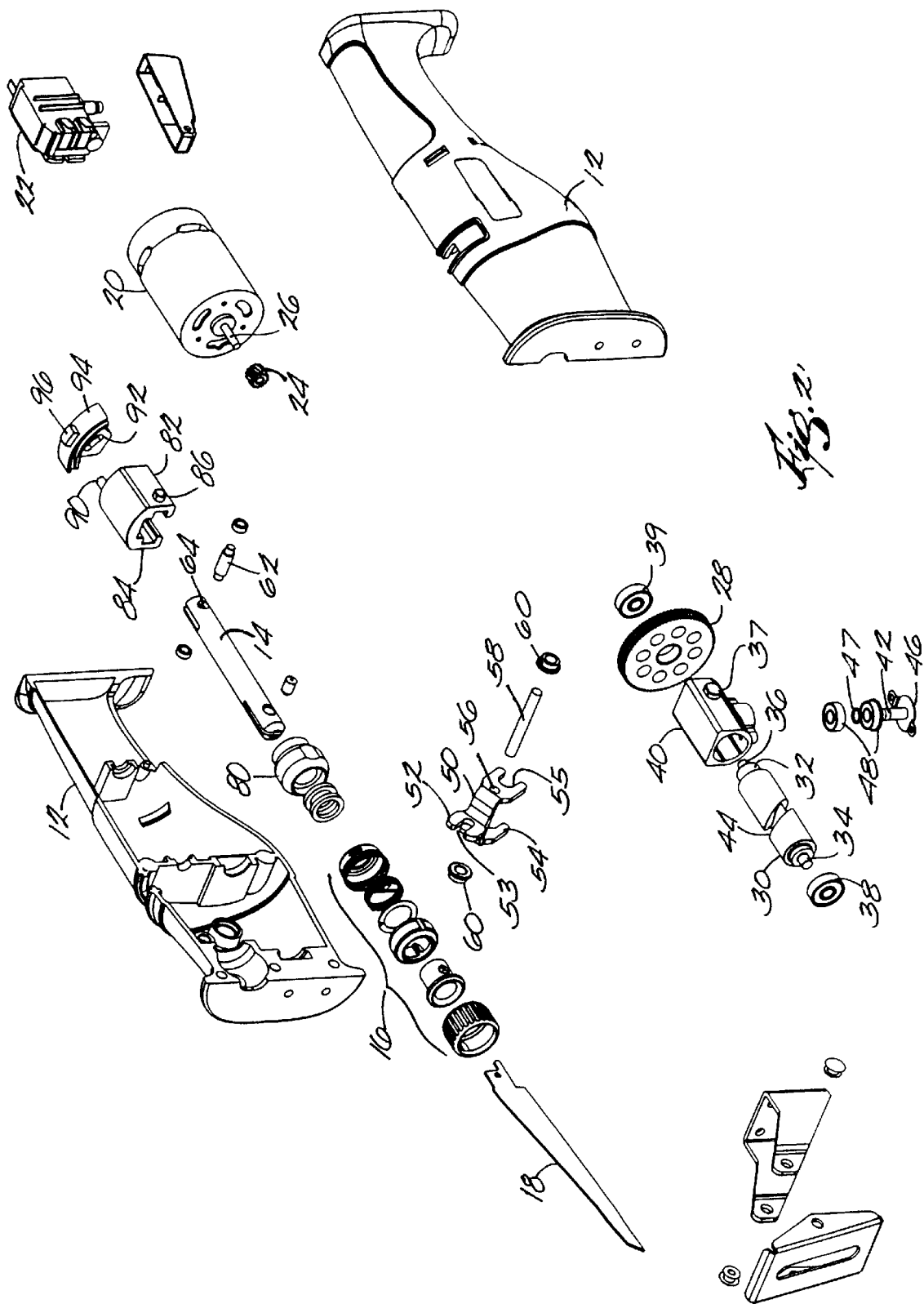

RECIPROCATING SAW

FIELD OF THE INVENTION

The invention relates to reciprocating saws, and more particularly to the drive mechanisms of reciprocating saws.

BACKGROUND OF THE INVENTION

Reciprocating saws are used to cut a variety of objects, such as metal pipes, wood and drywall. Such saws typically include a housing and a spindle mounted in the housing for reciprocating motion along an axis that is parallel to the longitudinal extent of the spindle. An electric motor provides power to the spindle through a mechanical reciprocating device that converts the rotary motion of a motor shaft to reciprocating motion of the spindle. Such mechanical reciprocating devices can, for example, include an eccentric drive, as disclosed in U.S. Pat. No. 5,079,844, or wobble plate drive, as disclosed in U.S. Pat. Nos. 5,025,562 and 5,050,307.

In addition to various types of drive mechanisms, there are also various types of reciprocating motion. For example, the simplest type is straight linear motion, in which the spindle and blade are translated along a linear path parallel to the spindle and returned along the same path. Alternatively, rocking motion is motion in which the spindle and blade are translated and returned along a path oblique to the spindle axis. Such motion may be straight or curved, and may help to drive the saw blade into the workpiece on the cutting stroke and retract the blade on the return stroke. As another alternative, orbital motion is motion in which the spindle and saw blade are translated along a cutting path and returned along a different path. Typically, the paths form a loop-type movement that forces the saw blade into the workpiece on the cutting stroke and then lifts the saw blade off the workpiece on the return stroke. All of these types of movement involve some reciprocation of the saw blade and are therefore considered to be a form of reciprocating motion.

The reciprocating motion of the spindle, and other components attached to the spindle such as the saw blade and drive components, causes vibration of the saw. Such vibration makes relative positioning of the saw to the work piece difficult, and can be significant in the case of hand held saws. Therefore, it is known to use a counterbalance that provides an inertial force opposed to the primary reciprocating inertial force. For example, in U.S. Pat. No. 5,025,562 issued Jun. 25, 1991 to Palm, a reciprocating saw is disclosed including a counterbalanced reciprocating drive having a jack shaft on which primary and secondary wobble plates are mounted. The primary wobble plate drives the spindle, and the secondary wobble plate drives a mass in a direction opposed to the spindle movement.

SUMMARY OF THE INVENTION

Incorporation of a counterbalance into prior art mechanical reciprocating devices, such as eccentric drives and wobble plate drives, can be complex and expensive. Further, the introduction of additional mechanisms into the devices can create another potential point of failure. Accordingly, it is an object of the present invention to design a saw that provides an improved drive mechanism without necessarily adding weight, cost, or complexity. It is a related object of the present invention to provide a reciprocating saw drive mechanism that may be inherently counterbalanced, i.e., the counterbalance is integral to the drive mechanism itself, thus not requiring additional moving parts. It is a further object of the present invention to provide a drive mechanism that incorporates a shock absorbing feature without adding significant weight, cost, or expense.

In accordance with these objectives, the invention provides a reciprocating saw comprising a housing, a spindle mounted for reciprocation relative to the housing, a motor for moving the spindle in a reciprocating fashion, and a reciprocating member interconnecting the motor with the spindle. The reciprocating member is adapted to move in a direction that is at least partially opposed to the direction of the spindle movement, and the motor and the spindle define a drive force path from the motor to the spindle, and at least part of the reciprocating member is in the drive force path. The reciprocating member may thereby be configured to counterbalance movement of the spindle. For example, the reciprocating member may have substantially the same mass as the spindle.

In one embodiment, the reciprocating member defines an axis and the spindle defines an axis, and the reciprocating member axis is offset from the spindle axis. The reciprocating member axis may be substantially parallel to the spindle axis. The reciprocating saw may further comprise a drive shaft that is driven by the motor wherein the reciprocating member is driven by the drive shaft. For example, the reciprocating member may comprise a barrel cam.

In one aspect, the saw can further include an actuating member in the form of a pivot body having a first end interconnected with the spindle and a second end driven by the motor. The pivot body can be mounted at a pivot point between the first and second ends. The pivot body may be movable perpendicular to pivot axis to thereby vary the extent to which the spindle is driven.

In yet another aspect, the saw includes a shock absorber mounted on the spindle and operatively positioned between the motor and the front end to at least partially absorb impact to the front end. The shock absorber may interconnected between the front end and an actuating member, and may be at least partially mounted within the spindle. Preferably, the shock absorber comprises an elastomeric cushion.

BRIEF DESCRIPTION OF THE DRAWINGS

FIG. 2 is a perspective view of the reciprocating saw, exploded to show individual components.

Figure 1:
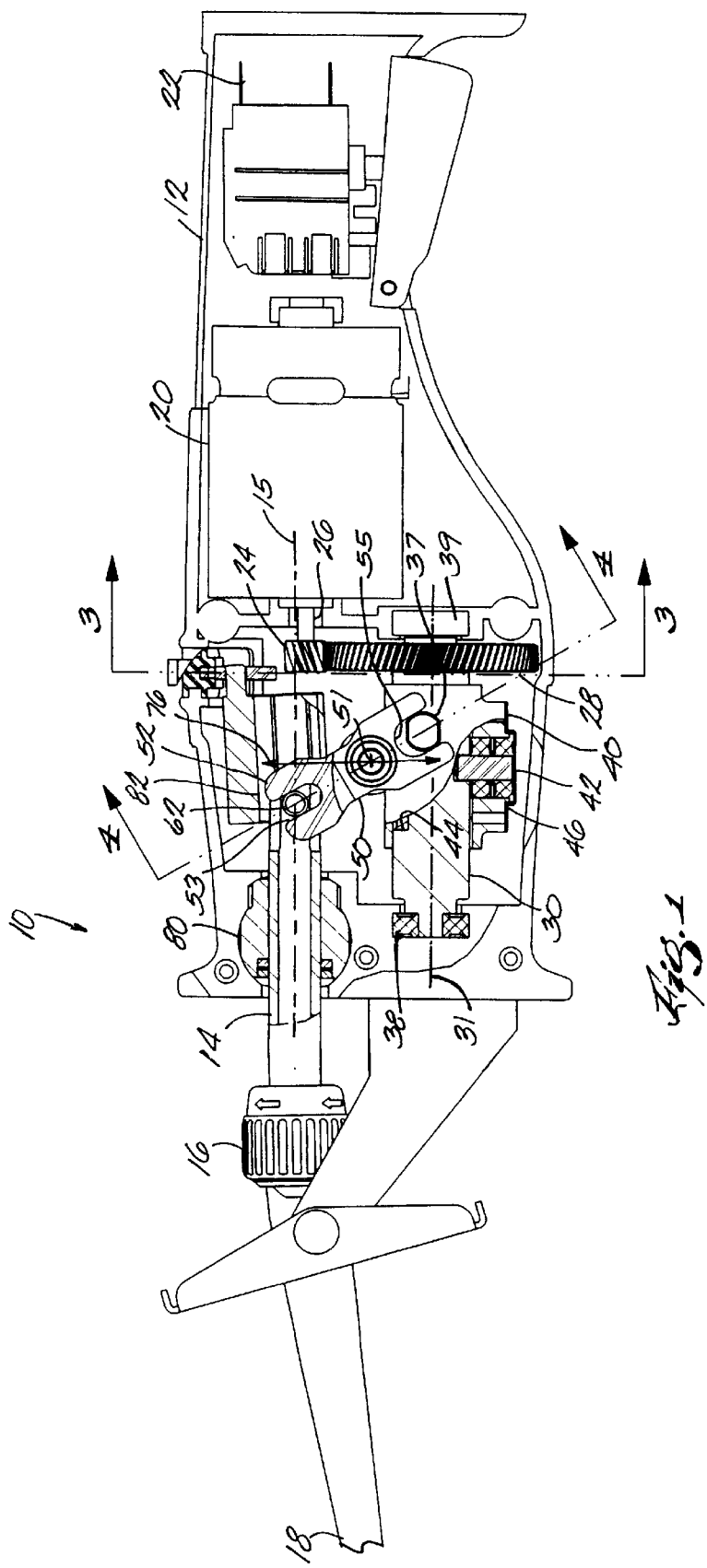
FIG. 1 is a side view of a reciprocating saw according to the present invention, shown in partial cross section.

Before one embodiment of the invention is explained in detail, it is to be understood that the invention is not limited in its application to the details of the construction and the arrangements of processes set forth in the following description or illustrated in the drawings. The invention is capable of other embodiments and of being practiced or being carried out in various ways. Also, it is understood that the phraseology and terminology used herein is for the purpose of describing the illustrated embodiment and should not be regarded as limiting the scope of the invention.

DETAILED DESCRIPTION

Referring to the drawings, FIG. 1 shows a reciprocating saw 10 according to the present invention. Some components of the reciprocating saw 10 may be similar or identical to components shown in U.S. patent application Ser. No. 08/699,448, herein incorporated by reference.

The reciprocating saw 10 generally includes a housing 12 that is configured to house the drive components at the front end and to fit an operator's hand at the rear end. The housing is split in two halves (FIG. 2), which are combined when the saw 10 is assembled. At the front end of the reciprocating saw 10 is a saw blade 18 mounted to a spindle 14 that reciprocates within the saw 10. Specifically, the saw blade 18 is mounted within a blade clamp 16 at the front end of the spindle 14. Such a blade clamp is shown and described in pending International Application No. PCT/US97/03633, which claims the benefit of U.S. Provisional Application Ser. No. 60/021,470, both of which are herein incorporated by reference.

In the configuration shown in FIG. 1, the saw blade 18 is oriented such that the serrations will face downward. Thus, the saw blade 18 is configured for downcutting. In some cases, it may be beneficial to reverse the saw blade 18 such that the teeth of the saw blade 18 face upward, thereby configuring the saw for upcutting. The spindle 14, the spindle drive mechanism, and the spindle clamp 16 may be suitably adapted to saw in both directions. Further, the type of motion of the saw blade 18 and the spindle 14 may be varied to make the motion of the saw blade 18 more suitable to upcutting or downcutting, as described hereinafter in further detail.

The spindle 14 reciprocates in a generally forward and rearward direction, and defines a spindle axis 15 through the center of the spindle 14. The saw blade 18 is reciprocated and thereby moved through a cutting stroke in one direction and a return stroke in a substantially opposite direction. A motor 20 powers the mechanism of the reciprocating saw 10 and moves the saw blade 18 through the cutting stroke and the return stroke. Power from the motor 20 passes through a number of components before being transferred to the saw blade 18. These components thereby define a drive force path that includes those components, or those portions of components, that carry a drive force from the motor 20 through to the spindle 14 and to the saw blade 18.

The motor 20 is fixedly mounted within the housing 12. The motor 20 may be externally powered or, as shown in FIG. 1, may include a plug 22 for a battery (not shown) that provides power to the motor 20. The motor 20 drives a motor pinion 24 through a motor shaft 26. The motor pinion 24 engages and drives a drive gear 28.

The drive gear 28 is coaxially mounted to a drive shaft 30. The drive gear 28 and the drive shaft 30 thereby define a drive axis 31. As shown in FIG. 2, the drive shaft 30 includes a shoulder 32 that is sized to fit the inner diameter of drive gear 28. The drive shaft 30 is reduced in diameter at a first end 34 and a second end 36. The first end 34 and the second end 36 are adapted to fit within a front bearing 38 and a rear bearing 39, respectively, that are fixedly mounted by their outer races inside the housing 12. Such bearings may be, for example, radial cartridge bearings.

As shown in FIGS. 1 and 2, a reciprocator body 40 fits over the drive shaft 30. The reciprocator body 40 translates the rotary motion of the drive shaft 30 to reciprocating motion. The reciprocator body 40 interacts with the drive shaft 30 by means of a drive pin 42 within a groove 44 of drive shaft 30. The drive pin 42 is held in a fixed position relative to the reciprocator body 40 by a pin retainer cup 46. The drive pin 42 is freely rotatable relative to the reciprocator body 40 and the pin retainer cup 46.

Two embodiments of the drive pin configuration are shown in the drawings. In the first embodiment, shown in FIGS. 1 and 2, a single drive pin 42 rides within a single groove 44. In the second embodiment, shown in FIGS. 5 and 6, a drive pin 42' and a follower pin 43' ride within a groove 44' and a follower groove 45', respectively. The follower pin 43' functions to more precisely locate the reciprocator body 40' relative to the drive shaft 30' and thereby prevent backlash. As shown in FIG. 6, the follower pin 43' preferably has a frustoconical tip, and the follower groove 45' is frustoconical in cross-sectional shape to receive the frustoconical tip. A further difference between the two illustrated embodiments is that in the first embodiment of FIGS. 1 and 2, the drive pin 42 rotates on bearings 48 separated by spacer 47. In the second embodiment of FIGS. 5 and 6, the drive pin 42' and the follower pin 43' rotate on bushings 49', such as sintered brass bushings, that separate the pins from the pin retainer cup 46'.

As one skilled in the art would recognize, the drive pin 42 will preferably be free to rotate relative to the pin retainer cup 46. Thus, the end of the drive pin 42 that rides within the groove 44 is preferably slightly smaller in size than the groove 44. The drive pin 42 will therefore roll along the sidewalls of the groove 44.

The pin retainer cup 46 may comprise a separate assembly that houses the drive pin 42 and is attached to the reciprocator body 40. Alternatively, the pin retainer cup 46 may, as shown in FIG. 2, comprise a plate that is attached at the end of the pin retainer cup to contain the drive pin 42. Such a plate or the entire pin retainer cup 46 may be affixed to the reciprocator body 40 by means of fasteners in order to permit disassembly and repair.

FIGS. 1 and 2 illustrate that the reciprocator body 40 includes a pair of the reciprocator pins 37 that extend from the side of the reciprocator body 40. As shown in the cross section of FIG. 4, the reciprocator pins 37 are reflected on both sides of the reciprocator body 40. The reciprocator pins 37 are generally cylindrical and have flattened top and bottom sides.

The reciprocator pins 37 of the reciprocator body 40 engage a pivot body 50. The pivot body 50 transfers the drive force to the spindle 14, and thus functions as an actuating member of the spindle 14. The pivot body 50 is pivotally mounted within the housing 12, and pivots about pivot axis 51.

Figure 4:
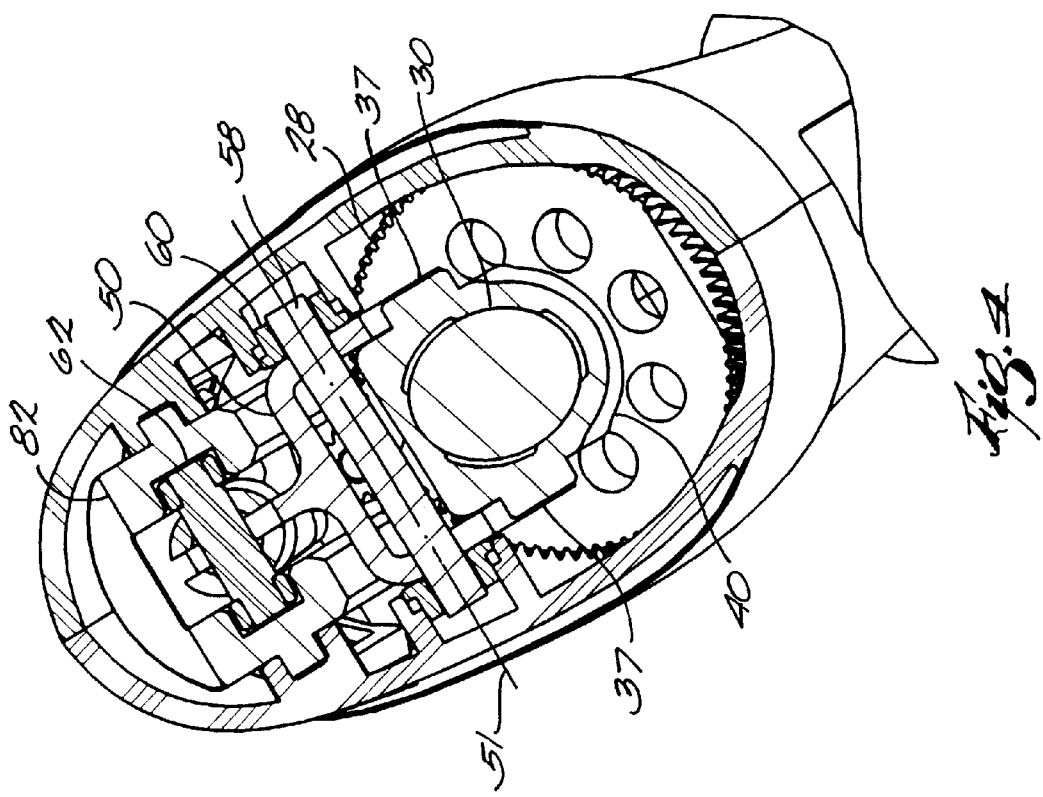
FIG. 4 is a cross-sectional view along line 4—4 of FIG. 1.
Figure 3:
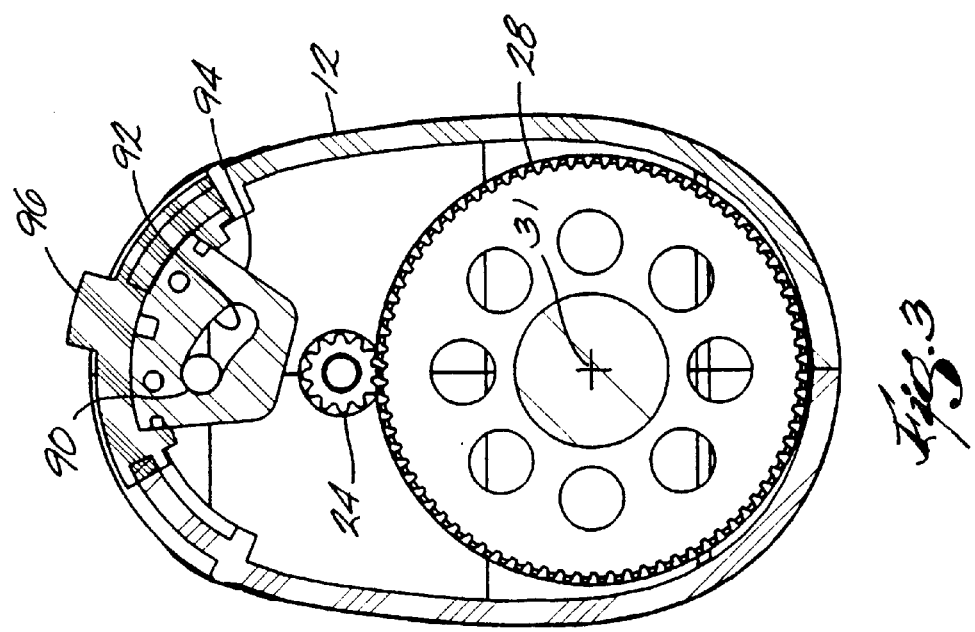
FIG. 3 is a cross-sectional view along line 3—3 of FIG. 1.

In the first embodiment shown in FIGS. 1 and 2, the pivot body 50 is generally Y-shaped and includes a first end 52 that engages the spindle 14, and a second end 54 that engages the reciprocator body 40. As best shown in FIGS. 2 and 4, the second end 54 includes two portions that are offset from the central axis of the reciprocating saw 10 and engage the two reciprocator pins 37 on either side of reciprocator body 40. The pivot body 50 further includes a pair of apertures 56 (FIG. 2) on either side of the pivot body 50, the apertures being configured to receive a pivot pin 58. The ends of pivot pin 58 are mounted within bushings 60 that are mounted within the housing 12.

The first end 52 includes an open slot 53 for engaging the spindle, and the second end 54 includes an open slot 55 on each side to engage the reciprocator pins. As the pivot body 50 pivots, and as the corresponding pins that are engaged within the slots 53, 55 reciprocate, the distance of the corresponding pins to the pivot axis 51 of the pivot body 50 changes. Therefore, an elongated slot is desired in the illustrated embodiment.

The first end 52 of the pivot body 50 engages spindle 14 by means of a spindle pin 62. The spindle pin 62 is cylindrical and engages the slot 53 in the first end 52. As FIG. 2 more clearly shows, the spindle pin 62 passes through an aperture 64 in the spindle 14, and the spindle pin 62 engages the walls of the aperture 64.

Figure 5:
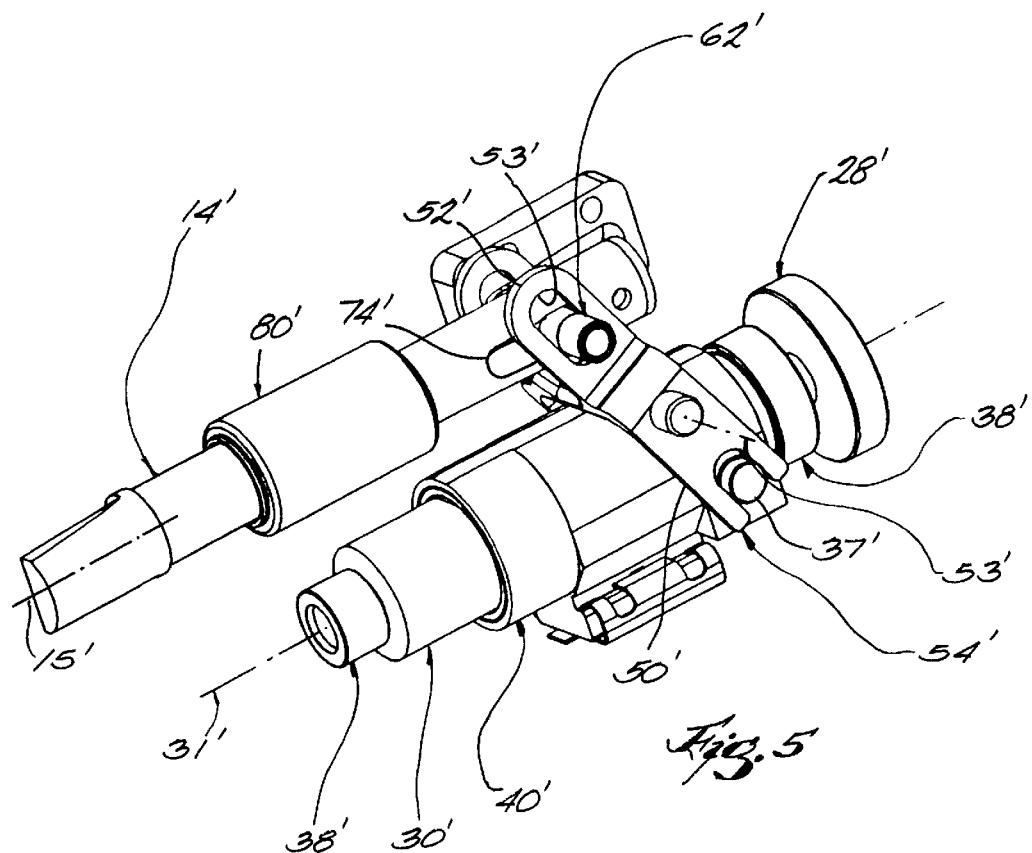
FIG. 5 is a perspective view of a portion of another embodiment of the reciprocating drive assembly.
Figure 6:
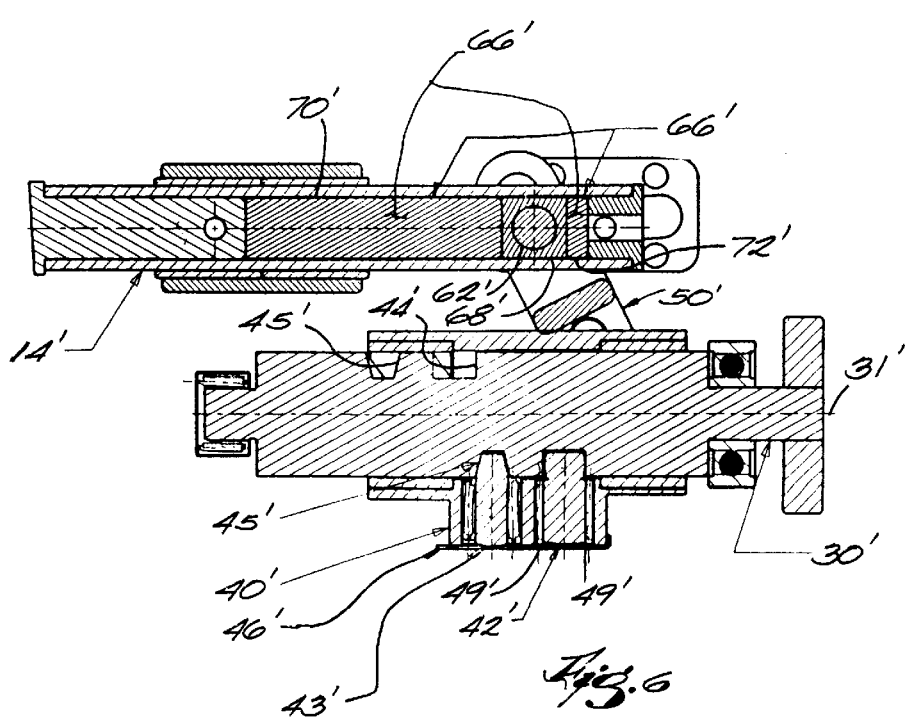
FIG. 6 is a side view, in cross section, of the reciprocating drive assembly portion of FIG. 5.

In the second embodiment, shown in FIGS. 5 and 6, the arrangement of the interconnection between pivot body 50' and spindle 14' is different. The pivot body 50' is generally X-shaped, having two portions on both the first end 52' and the second end 54'. The first end 52' engages the spindle pin 62' on both sides of the spindle 14'. The first end 52' of the pivot body 50' is shown as having closed slots 53', instead of an open slot as shown in the first embodiment. As long as the slots 53' are sufficiently long to engage the spindle pin 62' during the entire travel of the spindle 14', either configuration will function properly.

In either embodiment, the spindle pin 62 may be flexibly mounted to the spindle 14, such that a shock absorber is mounted between the spindle pin 62 and spindle 14. FIG. 6 shows, in cross section, such an arrangement in which a shock absorber 66' is made of an elastomeric, shock absorbing material, and is interconnected between the spindle pin 62' and the spindle 14'. Because the spindle pin 62' may then move relative to the spindle 14', it is necessary to configure the spindle 14' to permit such movement. For example, in the configuration shown in FIGS. 5 and 6, the spindle pin 62' could extend through a longitudinal slot 74' in the spindle 14', instead of the circular aperture 64 shown in FIG. 2.

As shown in the cross section of the spindle 14' in FIG. 6, the spindle pin 62' may be connected to a pin sleeve 68' that fits in the center of the spindle 14' and has a cylindrical passage for retaining the spindle pin 62'. The pin sleeve 68' presses against the shock absorber 66', and is mounted behind front shock portion 70' and in front of rear shock portion 72'. The rear shock portion 72' may be smaller such that the shock absorption is more stiff during the cutting stroke. The shock absorber 66' provides greater shock absorption in the event that, for example, the blade strikes a rigid object or is pinched during the return stroke. This increases the life of the mechanism and may prevent damage to the mechanism, as well as aiding the operator comfort.

The spindle 14 does not, in the preferred embodiment, reciprocate only along a spindle axis 15 that is parallel to the drive axis 31. Instead, for more effective cutting, the saw blade 18 can be moved with rocker motion as described in U.S. patent application Ser. No. 08/699,448. In short, the spindle 14 is reciprocated by moving the spindle pin 62 within a spindle track 82 having an adjustable inclination. The spindle track 82 thus provides an adjustable spindle path.

Referring to FIGS. 1 and 2, the angle of the spindle 14 may be selectively varied by adjustment of the position of spindle track 82. The spindle track 82 is pivotally mounted to the housing 12 at one end and can therefore be angled up or down. Referring to FIG. 2, a fixed end 84 includes a pair of track pins 86 that pivotally engage the housing 12. At a free end 88 of the spindle track, a pin 90 extends rearward. The pin 90 engages a slot 92 in a cam 94. The slot 92 has a shape that varies the vertical position of the pin 90 as the cam 94 rotates. The cam 94 may rotate relative to the housing. The cam 94 may be moved using a tab 96 that protrudes through the top of the housing 12. By adding frictional engagement points, the cam 94 motion can be made such that the user selects one of several positions of the cam 94. Frictional engagement between the cam 94 and the housing 12 thus keeps the cam 94 in a selected position.

In a preferred embodiment, the position of the spindle track 82 is adjustable such that the free end 88 is either at, above or below a horizontal position (as viewed in FIG. 1. Thus, the "rocker" motion can be tailored to the particular working conditions, such as the type of material and the blade used. Further, as previously mentioned, the reciprocating saw 10 of the present invention may be used for upcutting and downcutting. The motion of the saw blade 18 may be selected for optimal cutting in both upcutting and downcutting conditions.

Referring to FIGS. 1 and 2, the spindle 14 is mounted at the forward end of the reciprocating saw 10 by a spindle bushing 80. The spindle bushing 80 has a cylindrical inner surface to engage the outer surface of the spindle 14, and a spherical outer surface so as to be pivotally mounted within the housing 12. In this way, the angle of the spindle 14 relative to the housing 12 may be varied. When the reciprocating saw 10 is adjusted so that the saw blade 18 is rocking up or down, the outside of the spindle bushing 80 pivots relative to the housing 12.

As will be appreciated by one skilled in the art, in the illustrated embodiment the reciprocator body 40 both translates force from the drive shaft 30 to the spindle 14, and also reciprocates in a direction largely opposed to the direction of the spindle 14, thereby counterbalancing the reciprocating saw 10. Thus, the reciprocator body 40 is both a driving mechanism and a counterweight at the same time, without additional mechanisms or complexity. It can be seen that a drive force path exists from the motor 20, through motor pinion 24 and drive gear 28, through drive shaft 30, through reciprocator body 40, through pivot body 50, through spindle 14, and finally to saw blade 18. The portion of the reciprocator body 40 that is truly essential for operation of the saw 10 is the portion around drive shaft 30, around groove 44, and that contacts the pivot body 50 (i.e, at reciprocator pin 37). Any additional mass of the reciprocator body 40 serves to reinforce the structure and to provide a counterweight. Because the travel of the spindle 14 and the reciprocator body 40 may be determined by the geometry of the mechanism, the reciprocator body 40 may be designed to provide an inertial force that substantially balances the spindle 14 and therefore the reciprocating saw 10.

More particularly, during the cutting stroke, typically when the saw blade 18 is being retracted, the spindle 14 is travelling along a substantially rearward path. Adjustment of the spindle track 82 moves the path of travel of the spindle 14 and saw blade 18 somewhat, but still the travel is still largely rearward. While the spindle 14 is retracting, the reciprocating member 40 is travelling along a path in a forward direction and parallel to the drive axis 31. Thus, a substantial vector component of the direction of travel of the saw blade 18 and the spindle 14 will be opposed to the direction of travel of the reciprocating member 40 during the cutting stroke. If the spindle 14 is adjusted to reciprocate longitudinally along the spindle axis 15, then the travel will be exactly opposed. During the return stroke, the path of travel of the spindle 14 and the reciprocating member will be exactly the same as the extending stroke, but the components are moving in the opposite direction.

An additional benefit of the invention is that the configuration of the drive mechanism of the reciprocating saw 10 permits adjustment of the length of travel of the spindle 14 and thus the saw blade 18. This may be accomplished by varying the position of pivot axis 51. More specifically, pivot axis 51 can be varied up or down as indicated by arrows 76 in FIG. 1, in a direction perpendicular to the drive axis 31 and the spindle axis 15, in order to vary the travel of the spindle 14. Different housings 12 could be created with different pivot axis 51 positions, or the pivot axis 51 position could be made selectively adjustable with a housing 12 having the pivot pin 58 and bushings 60 being movable to different positions and fastenable at a selected position.

While the several embodiments of the present invention has been shown and described, alternative embodiments will be apparent to those skilled in the art and are within the intended scope of the present invention. Therefore, the invention is to be limited only by the following claims:

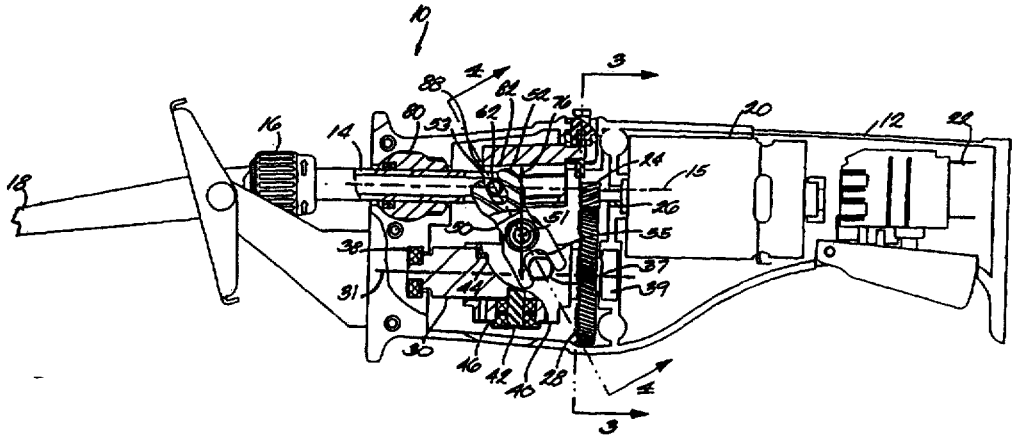

What is claimed is:

1. A reciprocating saw, comprising:
   a housing;
   a spindle mounted for reciprocation relative to said housing, said spindle having a front end adapted to support a saw blade, said spindle being movable through a cutting stroke and a return stroke;
   a motor for moving said spindle in a reciprocating fashion; and
   a pivot body having a first end interconnected with said spindle and a second end driven by said motor, said pivot body being mounted at a pivot point between said first and second ends;
   wherein said saw further comprises a reciprocating member driven by said motor, wherein said pivot body is interconnected to said reciprocating member at said second end, and wherein said reciprocating member includes a pin, and wherein said pivot body includes a slot for receiving said pin.

2. The reciprocating saw of claim 1, wherein said pivot body has a longitudinal axis, wherein said slot extends along said longitudinal axis, and wherein said pin is slidable in said slot along said longitudinal axis.

3. A reciprocating saw comprising:
   a housing;
   a spindle mounted for reciprocation relative to said housing, said spindle having a front end adapted to support a saw blade, said spindle being movable through a cutting stroke and a return stroke;
   a motor for moving said spindle in a reciprocating fashion;
   a reciprocating member driven by said motor for reciprocation along a drive axis; and
   a pivot body having a first end interconnected with said spindle and a second end driven by said motor, said pivot body being mounted at a pivot point between said first end and said second end, said pivot point being offset from said drive axis;
   wherein said spindle includes a spindle pin, wherein said pivot body includes a slot for receiving said spindle pin;
   wherein said pivot body has a longitudinal axis, wherein said slot extends along said longitudinal axis, and wherein said spindle pin is slidable in said slot along said longitudinal axis.

4. The reciprocating saw of claim 3, wherein said reciprocating member is configured to counterbalance movement of said spindle.

5. The reciprocating saw of claim 3, wherein said reciprocating member has substantially the same mass as said spindle.

6. The reciprocating saw of claim 3, wherein said reciprocating member defines a reciprocating member axis, wherein said spindle defines a spindle axis, and wherein said reciprocating member axis is offset from said spindle axis.

7. The reciprocating saw of claim 6, wherein said reciprocating member axis is substatially parallel to said spindle axis.

8. The reciprocating saw of claim 1, further comprising a drive shaft that is driven by the motor, and wherein said reciprocating member is driven by said drive shaft.

9. The reciprocating saw of claim 1, wherein said reciprocating member comprises a barrel cam.

10. The reciprocating saw of claim 3, wherein said pivot body is movably mounted to said housing.

11. The reciprocating saw of claim 3, wherein said pivot body is pinned to said housing at said pivot point.

12. The reciprocating saw of claim 3, wherein said pivot body is interconnected to said reciprocating member at said second end.

13. The reciprocating saw of claim 3, wherein said spindle has an inertial force, and wherein said reciprocating member provides an inertial force substantially equal in magnitude and opposite in direction to the inertial force of said spindle during the cutting stroke and during the return stroke.

14. The reciprocating saw of claim 3, wherein a pivot axis is defined through the pivot point and said spindle defines a spindle axis, said pivot axis being perpendicular to said spindle axis.

15. The reciprocating saw of claim 3, wherein said second end of said pivot body is connected with said reciprocating member, wherein a pivot axis is defined through said pivot point, and wherein said pivot axis is offset from said drive axis.

16. The reciprocating saw of claim 3, wherein said reciprocating member includes a reciprocating member pin, and wherein said pivot body includes a second slot for receiving said reciprocating member pin.

17. The reciprocating saw of claim 16, wherein said second slot extends along said longitudinal axis, and wherein said reciprocating pin is slidable in said second slot along said longitudinal axis.

* * * * *

UNITED STATES PATENT AND TRADEMARK OFFICE
CERTIFICATE OF CORRECTION

PATENT NO. : 6,212,781 B1
DATED : April 10, 2001
INVENTOR(S) : Dragomir C. Marinkovich and Roger Dean Neitzell It is certified that error appears in the above-identified patent and that said Letters Patent is hereby corrected as shown below:

Column 8, claim 8,
Line 18, delete "claim 1" and insert -- claim 3 --.
Line 21, delete "claim 1" and insert -- claim 3 --.

Title page,
Delete title page and substitute the attached title page.

Drawing,
Correct Figs. 1, 2 and 5 as follows:
Fig. 1 (below), add reference numeral 88 identifying the free end of the spindle track 82.

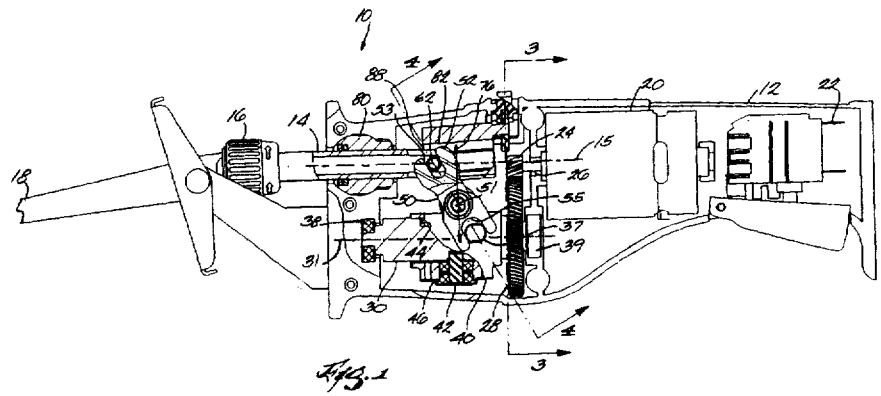

Fig. 2 (below), add reference numeral 88 identifying the free end of the spindle track 82.

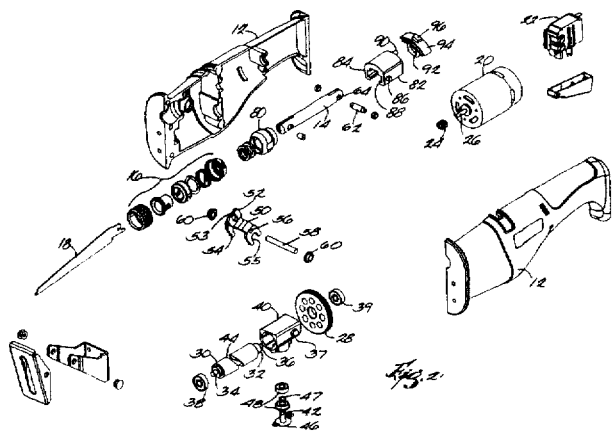

UNITED STATES PATENT AND TRADEMARK OFFICE
CERTIFICATE OF CORRECTION

PATENT NO. : 6,212,781 B1
DATED : April 10, 2001
INVENTOR(S) : Dragomir C. Marinkovich and Roger Dean Neitzell Page 2 of 3

It is certified that error appears in the above-identified patent and that said Letters Patent is hereby corrected as shown below:

Fig. 5 (below), change reference numeral 38' on the right side of the drawing to -- 39' --, identifying the rear bearing; and change reference numeral 53' on the right side of the drawing to -- 51' --, identifying the axis.

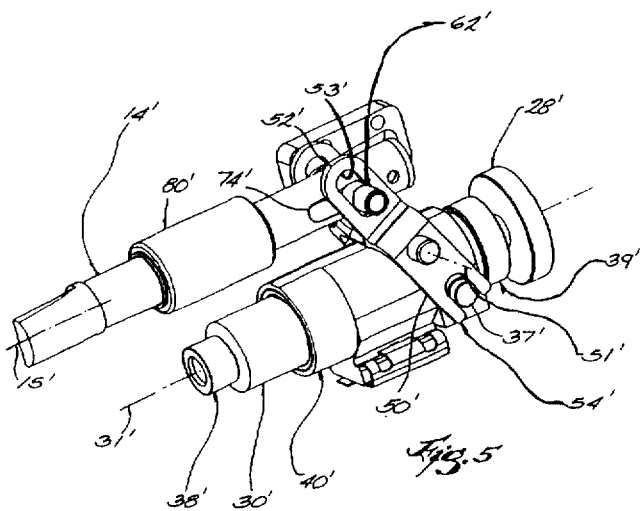

Fig. 5

Signed and Sealed this

Second Day of April, 2002

Attest:

JAMES E. ROGAN
Attesting Officer
Director of the United States Patent and Trademark Office

United States Patent
Marinkovich et al.

(10) Patent No.: US 6,212,781 B1
(45) Date of Patent: Apr. 10, 2001

(54) RECIPROCATING SAW

(75) Inventors: Dragomir C. Marinkovich, Butler; Roger Dean Neitzell, North Prairie, both of WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

(21) Appl. No.: 09/169,509

(22) Filed: Oct. 9, 1998

(51) Int. Cl.⁷ ................................................. B27B 19/04
(52) U.S. Cl. ........................................... 30/394; 74/57
(58) Field of Search ............................... 30/393, 392, 394; 173/176, 178; 74/55, 56, 57, 58; 464/182

(56) References Cited

U.S. PATENT DOCUMENTS

| | | |
|---|---|---|
| Re. 35,258 | 6/1996 | Palm ................................. 30/392 |
| 1,666,539 * | 4/1928 | Michell ............................... 74/56 |
| 2,084,321 * | 6/1937 | Corradino et al. ................... 74/57 |
| 2,563,789 * | 8/1951 | Kurtz et al. ...................... 74/55 X |
| 2,830,456 * | 4/1958 | Stafford ........................... 74/57 X |
| 3,206,989 * | 9/1965 | Enders ........................... 30/392 X |
| 3,585,719 * | 6/1971 | Kivela ............................... 30/392 |
| 3,596,525 * | 8/1971 | Niesz .................................. 74/57 |
| 3,802,079 * | 4/1974 | Ketchpel, Jr. et al. ........... 30/394 X |
| 3,945,120 | 3/1976 | Ritz ................................... 30/393 |
| 4,031,763 | 6/1977 | Eisenberg ........................... 74/50 |
| 4,125,033 * | 11/1978 | Riedl ............................... 74/56 X |
| 5,007,172 | 4/1991 | Palm ................................. 30/377 |
| 5,025,562 | 6/1991 | Palm ................................. 30/392 |
| 5,050,307 | 9/1991 | Palm ................................. 30/392 |
| 5,078,017 | 1/1992 | Zornes ............................... 74/50 |
| 5,079,844 | 1/1992 | Palm ................................. 30/392 |
| 5,134,777 | 8/1992 | Meyer et al. ....................... 30/392 |
| 5,450,925 * | 9/1995 | Smith et al. .................... 30/394 X |
| 5,566,458 | 10/1996 | Bednar .............................. 30/392 |
| 5,607,023 | 3/1997 | Palm ................................. 173/178 |
| 5,607,265 * | 3/1997 | Lane ............................. 30/392 X |
| 5,689,891 * | 11/1997 | Bednar et al. ....................... 30/394 |
| 5,782,000 | 7/1998 | Bednar . |
| 5,924,209 * | 7/1999 | Ward ............................ 30/394 X |
| 5,964,810 | 9/1999 | Hoelderlin et al. . |
| 6,012,346 * | 1/2000 | Vo ................................. 30/392 X |
| 6,021,573 * | 2/2000 | Kikuchi et al. ................... 30/392 |

* cited by examiner

Primary Examiner—Charles Goodman
(74) Attorney, Agent, or Firm—Michael Best & Friedrich LLP

(57) ABSTRACT

A reciprocating saw including a housing, a spindle mounted for reciprocation relative to the housing and having a front end adapted to support a saw blade, the spindle being movable through a cutting stroke and a return stroke, a motor for moving the spindle in a reciprocating fashion, and a reciprocating member interconnecting the motor with the spindle. The motor and the spindle define a drive force path from the motor to the spindle and passing through drive force bearing components of the reciprocating saw, and wherein at least part of the reciprocating member is in the drive force path. The reciprocating member is configured to counterbalance the spindle. A pivot body interconnects the spindle with the motor. A shock absorber is operatively positioned between the motor and the front end of the spindle, and is at least partially mounted within the spindle.

17 Claims, 4 Drawing Sheets